Patented July 24, 1928.

1,678,167

UNITED STATES PATENT OFFICE.

SANFORD K. ROBINSON, OF CHICAGO, ILLINOIS, ASSIGNOR, BY MESNE ASSIGNMENTS, TO KRAFT-PHENIX CHEESE COMPANY, OF CHICAGO, ILLINOIS, A CORPORATION OF ILLINOIS.

PROCESS OF REMAKING CHEESE.

No Drawing.   Application filed June 21, 1923.   Serial No. 646,921.

My invention relates to the art of remaking cheese and although capable of extended application is particularly valuable in remaking cheese of a normally solid variety, for example, Swiss cheese and cheese belonging to the cheddar group.

In general, my process may be considered as a modification or improvement of the process for treating cheese described in the United States Patent No. 1,323,869 granted to James L. Kraft on Dec. 2, 1919. When practicing the process described in said patent, I have found that although said process is eminently practical and efficient and although it has been used commercially on an extensive scale, and is now being so used, there are times when, possibly because of some peculiar characteristic of the material being worked up, there is a tendency for the cheese to disintegrate during the treatment. Also in other cases, the remade cheese may be somewhat seamy, may be grainy, may lack cohesion or may lack smoothness.

The principal objects of the invention are to provide an improved process for remaking cheese whereby the quality of the remade cheese equals or excels that of the original material; to provide an improved process of the character described which will not impair or affect the body, flavor, texture, appearance or wholesomeness of the article; to secure greater uniformity of result and otherwise to facilitate the art of remaking cheese of the character specified; to provide an improved emulsifying or fluxing ingredient for use in the heat treatment or fusion of cheese, and in general to provide an improved convenient, economical and efficient process and ingredient of the character described.

When practicing my invention in remaking cheddar cheese, I may employ substantially the same process as set forth in the said patent to Kraft, in so far as the mechanical and physical steps of the method are concerned. That is to say, I comminute the cheese which is to be treated, introduce same into a steam jacketed vessel or kettle equipped with paddles or agitators, and vigorously agitate or stir the material during the application of heat, said application of heat being preferably arrested when the cheese becomes plastic or stringy. The material ordinarily will assume such a degree of plasticity after it has been heated for about fifteen minutes and has attained a temperature of approximately one hundred forty-five degrees F. The working or agitation of the cheese is continued for about ten minutes after said temperature is attained, taking care, however, not to do more than maintain the body at the said limiting temperature of approximately one hundred forty-five degrees F.

After the working of the cheese has been completed, the same is immediately withdrawn from the kettle and introduced into suitable molds, for example wooden containers lined with tin foil as described in U. S. Patent No. 1,400,171, issued to James L. Kraft on December 13, 1921.

I am aware that prior inventors have suggested the use of sodium citrate and sodium phosphate as ingredients for facilitating the fusion of cheese. So far as I am aware however, prior to my invention, no other person has suggested using or has successfully employed tartaric acid or any of its compounds or derivatives as an emulsifying or fluxing ingredient for use in fusing cheese, and this is an important feature of my invention.

In using said ingredient, I prefer to select a normal tartrate or a mixed or double tartrate of an alkali metal or metals. By way of example, in the treatment of a batch of three hundred and fifty pounds of cheese of the cheddar group, I add to the comminuted material about one and one half pounds of the mixed or double tartrate of sodium and potassium. This ingredient is preferably added to the mixture before the application of heat is commenced, as is also the desired amount of common salt (from one-half to one per cent). Preferably also a small amount of water, for example five pounds, is added at the commencement of the treatment and fifteen pounds or so are added after the melting of the cheese is well under way. If the cheese is too pale in color to be readily saleable, a small quantity of coloring matter, such as annotto, is added during the later stages of the process.

Since the details of the process may be varied to suit individual requirements, the scope of the invention should be determined by reference to the appended claims, said claims being construed as broadly as possible, consistent with the state of the art.

I claim as my invention:

1. The improvement in the art of fusing cheese which consists in adding to the material during the process, a small quantity of a tartaric substance.

2. The improvement in the art of remaking cheese by a process which includes the steps of comminuting and heating the same, which consists in adding to the material during the process, a small quantity of an alkali metal tartrate.

3. The improvement in the art of remaking cheese of a normally solid variety by a process which includes the steps of comminuting the cheese, heating the same and stirring same, which consists in adding to the material during the process, a small quantity of the double tartrate of sodium and potassium.

4. The improvement in the art of fusing cheese which consists in adding to the material during the process, a small quantity of a tartrate.

5. The improvement in the art of remaking cheese by a process which includes the steps of comminuting and heating the same, which consists in adding to the material during the process, a relatively small quantity of an alkali tartrate.

SANFORD K. ROBINSON.